(12) United States Patent
Gudovskiy et al.

(10) Patent No.: US 11,481,613 B2
(45) Date of Patent: Oct. 25, 2022

(54) EXECUTION METHOD, EXECUTION DEVICE, LEARNING METHOD, LEARNING DEVICE, AND RECORDING MEDIUM FOR DEEP NEURAL NETWORK

(71) Applicant: Panasonic Intellectual Property Corporation of America, Torrance, CA (US)

(72) Inventors: Denis A. Gudovskiy, Emeryville, CA (US); Luca Rigazio, Campbell, CA (US)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 507 days.

(21) Appl. No.: 16/696,005

(22) Filed: Nov. 26, 2019

(65) Prior Publication Data

US 2020/0097802 A1 Mar. 26, 2020

Related U.S. Application Data

(63) Continuation of application No. PCT/US2018/048867, filed on Aug. 30, 2018.

(Continued)

(51) Int. Cl.
*G10L 15/22* (2006.01)
*G06N 3/063* (2006.01)
(Continued)

(52) U.S. Cl.
CPC .............. *G06N 3/063* (2013.01); *G06N 3/04* (2013.01); *G06N 3/084* (2013.01); *G10L 15/22* (2013.01)

(58) Field of Classification Search
CPC ......... G10L 25/30; G10L 15/16; G10L 19/00; G10L 19/0017; G06F 2205/003;
(Continued)

(56) References Cited

U.S. PATENT DOCUMENTS 10,586,344 B2 * 3/2020 Qi ........................ G06T 7/579
10,621,747 B2 * 4/2020 Malisiewicz ........ G06K 9/6271
(Continued)

OTHER PUBLICATIONS

Extended European Search Report dated Sep. 24, 2020 in corresponding European Patent Application No. 18854924.0.
(Continued)

*Primary Examiner* — Vijay B Chawan
(74) *Attorney, Agent, or Firm* — Wenderoth, Lind & Ponack, L.L.P.

(57) ABSTRACT

Executing a deep neural network by obtaining, during deep neural network inference, a binary intermediate feature map in binary representation by converting a floating-point or fixed-point intermediate feature map into a binary vector using a first transformation module; generating a compressed feature map by compressing the binary intermediate feature map using a nonlinear dimensionality reduction layer; storing the compressed feature map into memory; reconstructing the binary intermediate feature map by decompressing the compressed feature map read from the memory using a reconstruction layer corresponding to the nonlinear dimensionality reduction layer; and converting the reconstructed binary intermediate feature map into a floating-point or fixed-point intermediate feature map using a second transformation module.

7 Claims, 7 Drawing Sheets

| Activation size, KB | Base, fp32 | Fusion, fp32 | Fusion + Quantization, uint8 | Fusion + Quantization, uint4 | Fusion + Quantization + Binarization, uint8 |
|---|---|---|---|---|---|
| inp. (int8) | 768 | 768 | 768 | 768 | 768 |
| conv1 | 16384 | 0 | 0 | 0 | 0 |
| mpool1 | 4096 | 0 | 0 | 0 | 0 |
| fire2,3/sq. | 2048 | 2048 | 512 | 256 | 128 |
| fire2,3/exp. | 16384 | 0 | 0 | 0 | 0 |
| Total | 38912 | 2048 | 512 | 256 | 128 |
| mAP, % | 68.12 | 68.12 | 68.08 | 65.92 | 64.39 |
| Compress. | — | 19× | 76× | 152× | 304× |

Related U.S. Application Data

(60) Provisional application No. 62/554,224, filed on Sep. 5, 2017.

(51) Int. Cl.
  *G06N 3/04* (2006.01)
  *G06N 3/08* (2006.01)

(58) Field of Classification Search
  CPC .......... G06F 5/012; G06F 7/485; H03M 7/30; G06T 2207/20084; G06T 7/73; G06T 9/002; G06T 9/008
  See application file for complete search history.

(56) References Cited

U.S. PATENT DOCUMENTS

| | | | | |
|---|---|---|---|---|
| 10,922,573 | B2* | 2/2021 | Phan | G06V 40/23 |
| 10,950,009 | B2* | 3/2021 | Dinh | H04N 19/154 |
| 2003/0059121 | A1* | 3/2003 | Savakis | H04N 19/136 |
| | | | | 375/E7.181 |
| 2003/0103667 | A1* | 6/2003 | Soliman | G06T 9/008 |
| | | | | 382/253 |
| 2007/0233477 | A1* | 10/2007 | Halowani | H03M 7/30 |
| | | | | 704/232 |
| 2014/0085501 | A1* | 3/2014 | Tran | G06N 3/084 |
| | | | | 348/222.1 |
| 2016/0098249 | A1* | 4/2016 | Carlough | G06F 5/012 |
| | | | | 708/203 |
| 2016/0360202 | A1* | 12/2016 | Xu | H04N 19/103 |
| 2017/0132515 | A1* | 5/2017 | Yokoi | G06N 3/0454 |
| 2018/0137642 | A1* | 5/2018 | Malisiewicz | G06T 7/11 |
| 2020/0160070 | A1* | 5/2020 | Sholingar | G06V 10/82 |

OTHER PUBLICATIONS

L. Deng et al., "Binary Coding of Speech Spectrograms Using a Deep Auto-encoder", INTERSPEECH 2010, Sep. 2010, pp. 1692-1695.

D. Gudovskiy et al., "DNN Feature Map Compression using Learned Representation over GF(2)", Panasonic Beta Research Lab, Aug. 2018, pp. 1-15.

International Search Report (ISR) dated Nov. 5, 2018 in International (PCT) Application No. PCT/US2018/048867.

Forrest N Iandola, et al., "Squeezenet: Alexnet-Level Accuracy With 50X Fewer Parameters and <0.5MB Model Size", in ICLR 2017, arXiv preprint arXiv:1602.07360, Nov. 4, 2016.

Manoj Alwani, et al., "Fused-Layer CNN Accelerators", In MICRO, pp. 1-12, Oct. 2016.

Matthieu Courbariaux, et al., "Training Deep Neural Networks With Low Precision Multiplications", In ICLR 2015, Sep. 23, 2015.

Yoshua Bengio, et al., "Estimating or Propagating Gradients Through Stochastic Neurons for Conditional Computation", arXiv preprint arXiv:1308.3432, Aug. 15, 2013.

Philipp Gysel, et al., "Hardware-Oriented Approximation of Convolutional Neural Networks", in ICLR 2016, arXiv preprint arXiv: 1604.03168, Oct. 20, 2016.

* cited by examiner

FIG. 4

| Model | Weight size, MB | Activation size, KB | Top-1 accuracy, % | Top-5 accuracy, % |
|---|---|---|---|---|
| fp32 | 4.7 | 392.0 | 58.4 | 81.0 |
| Quantized, not converted to binary representation | | | | |
| uint8 | 4.7 | 98.0 | 58.6 (58.3) | 81.1 (81.0) |
| uint6 | 4.7 | 73.5 | 57.8 (55.5) | 80.7 (78.7) |
| uint4 | 4.7 | 49.0 | 54.9 (18.0) | 78.3 (34.2) |
| Quantized, converted to binary representation: $b() \to 1\times1 \to 1\times1 \to b^{-1}()$ | | | | |
| uint6 | 5.0 | 73.5 | 58.8 | 81.3 |
| uint4 | 4.9 | 49.0 | 57.3 | 80.0 |
| Quantized, converted to binary representation: $b() \to 3\times3/2 \to 3\times3*2 \to b^{-1}()$ | | | | |
| uint8 | 7.6 | 24.5 | 54.1 | 77.4 |
| uint6 | 6.9 | 18.4 | 53.8 | 77.2 |

FIG. 5

| Model | Weight size, MB | Activation size, KB | Top-1 accuracy, % | Top-5 accuracy, % |
|---|---|---|---|---|
| fp32 | 13.5 | 784.0 | 71.2 | 90.2 |
| Quantized, not converted to binary representation | | | | |
| int9 | 13.5 | 220.5 | 71.5 (71.2) | 89.9 (90.2) |
| int7 | 13.5 | 171.5 | 71.5 (68.5) | 89.8 (88.4) |
| int5 | 13.5 | 122.5 | 70.9 (7.3) | 89.4 (17.8) |
| Modified: ReLU nonlinearity added | | | | |
| uint8 | 13.5 | 196.0 | 71.6 | 90.0 |
| Quantized, converted to binary representation: $b() \to 1\times 1 \to 1\times 1 \to b^{-1}()$ | | | | |
| uint6 | 13.7 | 147.0 | 70.9 | 89.4 |
| uint4 | 13.6 | 98.0 | 69.5 | 88.5 |
| Quantized, converted to binary representation: $b() \to 2\times 2/2 \to 2\times 2*2 \to b^{-1}()$ | | | | |
| uint8 | 14.2 | 49.0 | 66.6 | 86.9 |
| uint6 | 14.0 | 36.8 | 66.7 | 86.9 |

FIG. 6

| Model | Weight size, MB | Activation size, KB | mAP, % |
|---|---|---|---|
| fp32 | 23.7 | 2048 | 68.12 |
| Quantized, not converted to binary representation | | | |
| uint8 | 23.7 | 512 | 68.08 (68.04) |
| uint6 | 23.7 | 384 | 67.66 (67.14) |
| uint4 | 23.7 | 256 | 65.92 (44.13) |
| uint2 | 23.7 | 128 | 55.86 (0.0) |
| Quantized, converted to binary representation: $b() \to 1 \times 1 \to 1 \times 1 \to b^{-1}()$ | | | |
| uint6 | 23.9 | 384 | 68.17 |
| uint4 | 23.8 | 256 | 65.42 |
| Quantized, converted to binary representation: $b() \to 3 \times 3/2 \to 3 \times 3*2 \to b^{-1}()$ | | | |
| uint8 | 26.5 | 128 | 63.53 |
| uint6 | 25.9 | 96 | 62.22 |
| Quantized, converted to binary representation: $b() \to 2 \times 2/2 \to 2 \times 2*2 \to b^{-1}()$ | | | |
| uint8 | 24.9 | 128 | 64.39 |
| uint6 | 24.6 | 96 | 62.09 |

FIG. 7

| Activation size, KB | Base, fp32 | Fusion, fp32 | Fusion + Quantization, uint8 | Fusion + Quantization, uint4 | Fusion + Quantization + Binarization, uint8 |
|---|---|---|---|---|---|
| inp. (int8) | 768 | 768 | 768 | 768 | 768 |
| conv1 | 16384 | 0 | 0 | 0 | 0 |
| mpool1 | 4096 | 0 | 0 | 0 | 0 |
| fire2,3/sq. | 2048 | 2048 | 512 | 256 | 128 |
| fire2,3/exp. | 16384 | 0 | 0 | 0 | 0 |
| Total | 38912 | 2048 | 512 | 256 | 128 |
| mAP, % | 68.12 | 68.12 | 68.08 | 65.92 | 64.39 |
| Compress. | — | 19× | 76× | 152× | 304× |

EXECUTION METHOD, EXECUTION DEVICE, LEARNING METHOD, LEARNING DEVICE, AND RECORDING MEDIUM FOR DEEP NEURAL NETWORK

CROSS REFERENCE TO RELATED APPLICATIONS

This is a continuation application of PCT International Application No. PCT/US2018/048867 filed on Aug. 30, 2018, designating the United States of America, which is based on and claims priority of U.S. Provisional Patent Application No. 62/554,224 filed on Sep. 5, 2017. The entire disclosures of the above-identified applications, including the specifications, drawings and claims are incorporated herein by reference in their entirety.

FIELD

The present disclosure relates to, for example, an execution method for a deep neural network.

BACKGROUND

Recent achievements of deep neural networks (hereinafter referred to as DNN) make them an attractive choice in many computer vision applications including image classification and object detection. However, the memory and computations required for DNNs can place an excessive processing load on low-power deployments.

Proposed or suggested methods of reducing such processing load include layer fusion in which calculation of layers can be fused without storing intermediate feature maps into memory, and compression of quantized feature map values using nonlinear dimensionality reduction layers (see Non Patent Literature (NPL) 1 and 2).

CITATION LIST

Non Patent Literature

[NPL 1] M. Alwani, H. Chen, M. Ferdman, and P. A. Milder; Fused-layer CNN accelerators; MICRO; pages 1-12; October 2016

[NPL 2] F. N. Iandola, S. Han, M. W. Moskewicz, K. Ashraf, W. J. Daily, and K. Keutzer; Squeezenet: Alexnet-level accuracy with 50× fewer parameters and <0.5 MB model size; arXiv preprint arXiv:1602.07360, 2016

SUMMARY

Technical Problem

However, the reductions in DNN processing load gained by the above methods are small and may introduce a reduction in accuracy. Furthermore, the improvement in processing speed is insufficient.

The present disclosure provides, for example, an execution method and execution device characterized by a low processing load and fast processing with a reduced drop in accuracy.

Solution to Problem

In order to solve the above problem, an execution method for a DNN according to one aspect of the present disclosure includes: obtaining, during deep neural network inference, a binary intermediate feature map in binary representation by converting a floating-point or fixed-point intermediate feature map into a binary vector using a first transformation module; generating a compressed feature map by compressing the binary intermediate feature map using a nonlinear dimensionality reduction layer; storing the compressed feature map into memory; reconstructing the binary intermediate feature map by decompressing the compressed feature map read from the memory using a reconstruction layer corresponding to the nonlinear dimensionality reduction layer; and converting the reconstructed binary intermediate feature map into a floating-point or fixed-point intermediate feature map using a second transformation module.

These general and specific aspects may be implemented using a system, a device, an integrated circuit, a computer program, a computer-readable recording medium (e.g. CD-ROM), or any combination of systems, devices, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The DNN execution method, etc., according to the present disclosure are characterized by a low processing load and fast processing with a reduced drop in accuracy.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 shows the results of inference accuracies from an ImageNet dataset when the execution method is applied to SqueezeNet architecture in Implementation Example 1.

FIG. 5 shows the results of inference accuracies from an ImageNet dataset when the execution method is applied to MobileNetV2 architecture in Implementation Example 1.

FIG. 6 shows the results of inference accuracies from a VOC2007 dataset when the execution method is applied to an SSD512 model in Implementation Example 2.

FIG. 7 illustrates memory usage in SSD512 models in Implementation Example 2.

DESCRIPTION OF EMBODIMENTS

Figure 1:
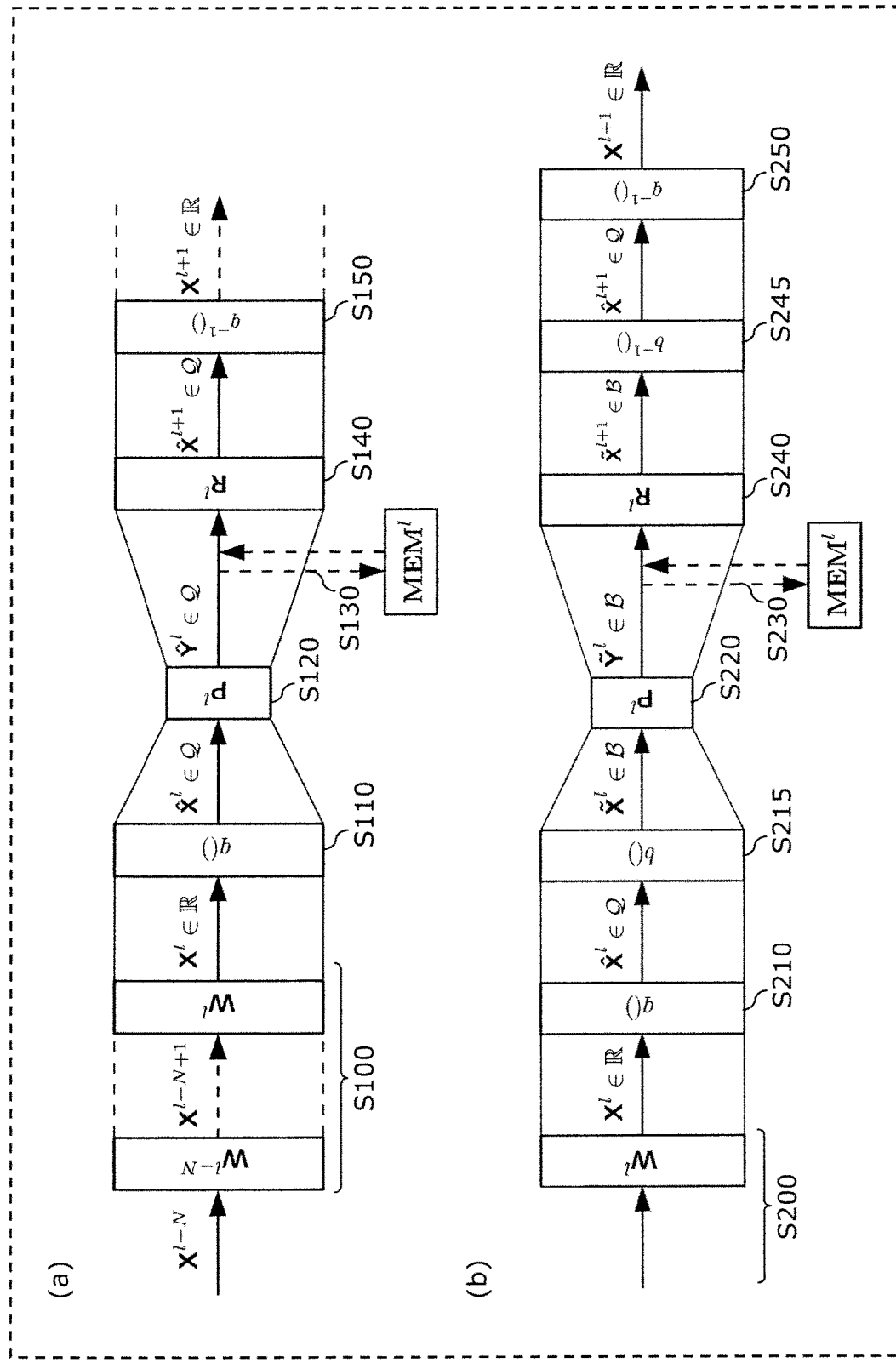
FIG. 1 shows a model illustrating a method according to an embodiment of executing a DNN during inference.

An execution method for a DNN according to one aspect of the present disclosure includes: obtaining, during deep neural network inference, a binary intermediate feature map in binary representation by converting a floating-point or fixed-point intermediate feature map into a binary vector using a first transformation module; generating a compressed feature map by compressing the binary intermediate feature map using a nonlinear dimensionality reduction layer; storing the compressed feature map into memory; reconstructing the binary intermediate feature map by decompressing the compressed feature map read from the memory using a reconstruction layer corresponding to the nonlinear dimensionality reduction layer; and converting the reconstructed binary intermediate feature map into a floating-point or fixed-point intermediate feature map using a second transformation module.

With this, compared to conventional art, it is possible to execute DNNs with little memory usage. This reduction in memory bandwidth leads to an increase in processing speeds.

Here, for example, the nonlinear dimensionality reduction layer may b a single projection convolved layer or a sequence of projection convolved layers, and the reconstruction layer may be a single reconstruction convolved layer or a sequence of reconstruction convolved layers.

A backpropagation-based learning method for the deep neural network executed using the above execution method, includes: applying an analytical derivative of the first transformation module and the second transformation module to a gradient for a next layer among layers included in the deep neural network to generate a gradient for a previous layer among the layers included in the deep neural network; updating a weight and a bias based on the gradient generated for the previous layer; and initializing a weight for the nonlinear dimensionality reduction layer and a weight for the reconstruction layer, based on an identity mapping function.

The addition of processing for binary representation in inference makes learning possible at the binary level. This allows DNNs to be executed with less memory usage and faster processing speeds than conventional art.

These general and specific aspects may be implemented using a system, a device, an integrated circuit, a computer program, a computer-readable recording medium (e.g. CD-ROM), or any combination of systems, devices, integrated circuits, computer programs, or computer-readable recording media.

Hereinafter, an exemplary embodiment is described in detail with reference to the Drawings.

The exemplary embodiment described below shows a general or specific example. The numerical values, shapes, materials, elements, the arrangement and connection of the elements, steps, the processing order of the steps etc. shown in the following exemplary embodiment are mere examples, and therefore do not limit the scope of the appended Claims and their equivalents. Therefore, among the elements in the following exemplary embodiment, those not recited in any one of the independent claims are described as optional elements.

Embodiment

[DNN]

First, a commonly used DNN will be described.

The input feature map $X^{l-1}$ of an l-th convolution layer in commonly used DNNs can be represented by (1), where $\check{C}$, H, and W are the number of input channels, the height and the width, respectively. $\mathbb{R}$ represents all real numbers.

$$X^{l-1} \in \mathbb{R}^{\check{C} \times H \times W} \quad (1)$$

The input $X^{l-1}$ is convolved with a weight tensor $W^l$ represented by (2), where C is the number of output channels, $H_f$ and $W_f$ are the height and the width of filter kernel, respectively.

$$W^l \in \mathbb{R}^{C \times \check{C} \times H_f \times W_f} \quad (2)$$

Note that the bias vector b represented by (3) is added to the result of convolution operation.

$$b \in \mathbb{R}^C \quad (3)$$

Once all C channels are computed, an element-wise nonlinear function is applied to the result of the convolution operations. Then, the C-th channel of the output tensor $X^l$ represented by (4) can be computed using the computational expression represented by (5).

$$X^l \in \mathbb{R}^{C \times H \times W} \quad (4)$$

$$X^l_c = g(W^l_c * X^{l-1} + b_c) \quad (5)$$

Note that * in (5) denotes convolution operation, and g ( ) is some nonlinear function. For example, assume g( ) is a rectified linear unit (ReLU) defined as g(x)=max(0,x) such that all activations are non-negative.

Please reference the above as needed for comprehension of denotations used in the figures and the following description.

[DNN Execution Method]

Next, a method according to this embodiment for executing a DNN during inference will be described. FIG. 1 shows a model that illustrates a DNN execution method according to this embodiment. In FIG. 1, the model indicated by (a) is a conventional method, and the model indicated by (b) is a method according to this embodiment. The two models are contrasted for comparative purposes.

The models indicated by (a) and (b) schematically illustrate neural networks including multiple convolution layers and processed from left to right. Note that to simplify notification, biases are not shown in either of the models.

First, with the conventional method indicated by (a), the calculation of N sequential layers is fused together (step S100) without storing intermediate feature maps $X^{l-N+1}$ through $X^{l-1}$ to obtain feature map $X^l$. This fusion can be done in a channel-wise fashion using memory buffers which are much smaller than the whole feature map.

Next, feature map $X^l$ is quantized using a nonlinear function q( ) (step S110). Pre-quantization feature map $X^l$ is an element of a field of real numbers $\mathbb{R}$, and quantized feature map $\hat{x}^l$ is an element of a finite field over integers. The quantization step may introduce a reduction in accuracy due to imperfect approximation. The network architecture is not changed after quantization and feature maps are compressed only up to a certain suboptimal bitwidth resolution.

Next, nonlinear dimensionality reduction is performed using an additional convolution layer (step S120). Here, the mapping represented in (6) is performed using the projection weights $P^l$ represented in (7).

$$\hat{x}^l \in Q^{C \times H \times W} \to \hat{y}^l \in Q^{\tilde{C} \times H \times W} \quad (6)$$

$$P^l \in \mathbb{R}^{\tilde{C} \times C \times H_f \times W_f} \quad (7)$$

Note that $\tilde{C}$ in (6) and (7) denotes output channel dimension, and is less than C. Here, only the compressed feature map $\hat{Y}^l$ needs to be stored in the memory buffer (step S130).

Thereafter, the compressed feature map $\hat{Y}^l$ can be projected back onto the high-dimensional tensor using the weights $R^l$ (step S140). Lastly, an inverse transform using an inverse quantization function $q^{-1}(\ )$ (step S150) is performed to obtain the feature map $X^{l+1}$, which is an element of a field of real numbers.

Next, the DNN execution method according to this embodiment, which is illustrated in (b) in FIG. 1, will be described. Unlike the conventional method, this method includes a transformation for representing an intermediate feature map using a binary vector. First, this transformation will be described.

First, consider a scalar x derived from feature map $X^l$, which is an element of a field of real numbers. Here, conventional quantization can be represented by (8), where a scalar-to-scalar mapping or nonlinear function is expressed as q(x).

$$x \in \mathbb{R}^{1\times 1} \xrightarrow{q(\ )} \hat{x} \in \mathcal{Q}^{1\times 1} : \min \|x - \hat{x}\|_2 \qquad (8)$$

Note that $\hat{x}$ is the quantized scalar, $\mathcal{Q}$ is the $GF(2^B)$ finite field for fixed-point representation, and B is the number of bits.

Here, in this embodiment, a new $\hat{x}$ representation is introduced by a linear binarization function $b(\ )$ defined by (9).

$$\hat{x} \in \mathcal{Q}^{1\times 1} \xrightarrow{b(\ )} \tilde{x} \in \mathcal{B}^{B\times 1} : \tilde{x} = b \otimes \hat{x} \qquad (9)$$

Here, $\otimes$ is a bitwise AND operation. Additionally, vector $b=[2^0, 2^1, \ldots, 2^{B-1}]^T$, and $\mathcal{B}$ is finite field GF(2).

An inverse function of the linear binarization function $b(\ )$ is expressed as in (10).

$$\tilde{x} \in \mathcal{B}^{B\times 1} \xrightarrow{b^{-1}(\ )} \hat{x} \in \mathcal{Q}^{1\times 1} : \hat{x} = b^T \tilde{x} = b^T b \otimes \hat{x} = (2^B - 1) \otimes \hat{x} \qquad (10)$$

Equations (9) and (10) show that a scalar over a higher cardinality finite field can be linearly converted to and from a vector over a finite field with two elements.

Hereinafter, a DNN execution method according to this embodiment including compression of a feature map based on these derivations will be described in accordance with (b) in FIG. 1.

The layers before the layer in which the feature map $X^l$ is obtained (step S200) are the same as those through step S100 in (a). Accordingly, description and indication in the drawings of steps before step S200 are omitted.

In the next layer, feature maps $X^l$, which are activations, are quantized to obtain feature map (step S210). In the next layer, the transformation in (9) is applied to feature map $\hat{x}^l$ (step S215). The result of this transformation, feature map $\tilde{x}^l$, is represented by (11).

$$\tilde{x}^l \in \mathcal{B}^{B\times C\times H\times W} \qquad (11)$$

The feature map $\tilde{x}^l$ converted to binary representation in such a manner is hereinafter also referred to as a binary intermediate feature map.

For implementation convenience, a bit dimension newly added to (11) can be concatenated along channel dimension resulting in the binary intermediate feature map $\tilde{x}^l$ shown in (12).

$$\tilde{x}^l \in \mathcal{B}^{BC\times H\times W} \qquad (12)$$

Note that a module of layers in which the processes in steps S210 and S215 are executed is one example of a first transformation module according to this embodiment.

A single nonlinear dimensionality reduction layer using projection weights $P^l$ or a sequence of nonlinear dimensionality reduction layers with $P_i^l$ projection weights can be applied to this binary intermediate feature map $\tilde{x}^l$ to obtain a compressed representation of binary intermediate feature map $\tilde{x}^l$ in binary vectors over finite field GF(2) (hereinafter also referred to as a compressed feature map $\tilde{Y}^l$) (step S220).

Only the compressed feature maps $\tilde{Y}^l$, which are elements of field $\mathcal{B}$, need to be stored in memory during inference (step S230). Non-compressed feature maps can be processed using small buffers, e.g., in a sequential channel-wise fashion, and therefore need not be stored in memory.

Then, in the layer after processing using convolutional layers $R_i^l$, a binary intermediate feature map whose above-described compression is undone is reconstructed (step S240). Once the reconstructed binary intermediate feature map is input into the next layer, the binary representation is undone using the inverse function $b^{-1}(\ )$ from (10) (step S245) to convert the binary intermediate feature map into an intermediate feature map, which is an element of a field of integer elements, and then an inverse quantization function $q^{-1}(\ )$ is applied to further convert the intermediate feature map into a feature map, which is an element of a field of real numbers (S250).

Note that a module of layers in which the processes in steps S245 and S250 are executed is one example of a second transformation module according to this embodiment.

This concludes the description of the DNN execution method according this embodiment. Next, performance evaluations related to memory usage and accuracy under this method will be introduced and compared with those of conventional methods in an implementation example (to be described later).

[DNN Learning Method]

Figure 2:
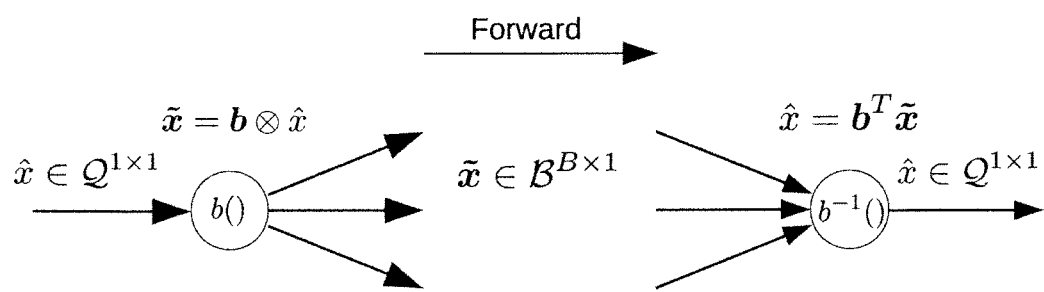
FIG. 2 is a model illustrating a forward pass during inference.
Figure 3:
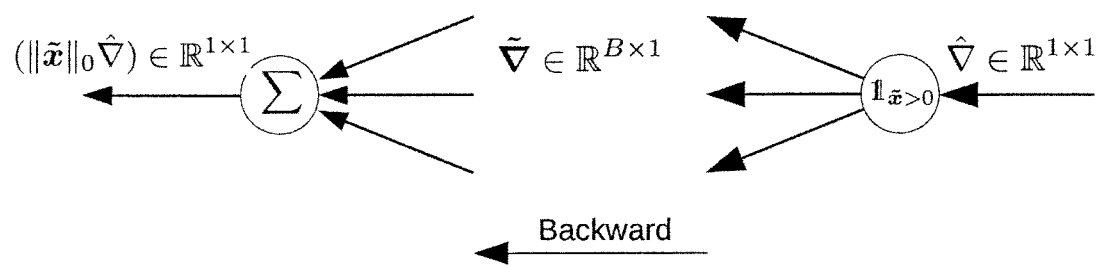
FIG. 3 is a model illustrating a backward pass during backpropagation corresponding to the execution method.

Next, a backpropagation learning method for the deep neural network executed using the method described above will be described. FIG. 2 is a model illustrating a forward pass during inference in the execution method described above. FIG. 3 is a model illustrating a backward pass during backpropagation corresponding to the execution method described above. The inference pass in FIG. 2 corresponds to equation (9), and the inference pass in FIG. 3 corresponds to equation (10).

Newly introduced function $b^{-1}(\ )$ in the DNN execution method according to this embodiment can be represented as a gate that makes hard decisions similar to ReLU. The gradient of function $b^{-1}(\ )$ can then be calculated using (13).

$$\hat{\nabla} \in \mathbb{R}^{1\times 1} \xrightarrow{b^{-1}(\ )} \tilde{\nabla} \in \mathbb{R}^{B\times 1} : \tilde{\nabla} = \mathbb{1}_{\hat{x}>0} \nabla \qquad (13)$$

Lastly, the gradient of function $b(\ )$ is a scaled sum of the gradient vector calculated by (14).

$$\tilde{\nabla} \in \mathbb{R}^{B\times 1} \xrightarrow{b(\ )} \hat{\nabla} \in \mathbb{R}^{1\times 1} : \hat{\nabla} = \mathbb{1}^T \tilde{\nabla} = \mathbb{1}^T \mathbb{1}_{\hat{x}>0} \nabla = \|\tilde{x}\|_0 \nabla \qquad (14)$$

Note that $\|\tilde{x}\|_0$ in (14) is a gradient scaling factor that represents the number of nonzero elements in $\tilde{x}$. Practically, the scaling factor can be calculated based on statistical information only once and used as a static hyperparameter for gradient normalization.

Since the purpose of the network according to this embodiment is to learn and keep only the smallest $\tilde{Y}^l$, the choice of $P^l$ and $R^l$ initialization is important. Therefore, we can initialize these weight tensors by an identity function that maps the non-compressed feature map to a compressed feature map and vice versa to provide a suitable starting point for training. At the same time, other initializations are possible, e.g., noise sampled from some distribution can be added as well.

Implementation Example 1

[Outline]

The binarization and quantization layers described in the embodiment were implemented using SqueezeNet V1.1 and Mobilenet V2 as base floating-point network architectures.
[SqueezeNet V1.1]

In this implementation example, the "fire2/squeeze" and "fire3/squeeze" layers which are the largest of the "squeeze" layers due to high spatial dimensions were compressed. The input to the network has a resolution of 227×227, and the weights are all floating-point.

The quantized and compressed models are retrained for 100,000 iterations with a mini-batch size of 1,024 on the ImageNet (ILSVRC2012) training dataset, and stochastic gradient descent solver with a step-policy learning rate starting from $1e^{-3}/10$ every 20,000 iterations. Although this large mini-batch size was used by the original model, it helps the quantized and compressed models to estimate gradients as well. The compressed models were derived and retrained iteratively from the 8-bit quantized model. FIG. 4 shows the results of inference accuracies of 50,000 images from an ImageNet validation dataset. The leftmost column indicates model type (fp32: number of single-precision floating points, uint8: 8-bit unsigned integer array, etc.), and the remaining columns indicate, from left to right: weight data size; activation, i.e., feature map size; top-most answer (top-1) accuracy; and top five answer (top-5) accuracy. Values outside the parenthesis indicate accuracies with retraining, and values inside the parenthesis indicate accuracies without retraining.

According to these results, when binary representation conversion is performed and 1×1 convolution kernels are used, compared to when binary representation conversion is not performed, although the number of weights slightly increases, accuracy increases in the respective models (top-1 accuracy: 6-bit=1.0% increase, 4-bit=2.4% increase). When a 3×3 stride 2 convolution kernel was used, an increase of approximately 47% in weight size for the 6-bit model was observed. That allowed for a decrease in the spatial dimension of feature maps by exploiting local spatial quantization redundancies. Then, the size of feature map activations is further reduced by a factor of 4 compared to when there is no conversion into binary representation, while top-1 accuracy dropped by 4.3% and 4.6% for 8-bit and 6-bit models, respectively, compared to fp32.
[MobileNetV2]

The "conv2_1/linear" feature map was compressed. This feature map is nearly three times the size of any other feature map. The same training hyperparameters are used as in the SqueezeNet setup. The number of iterations is 50,000 with proportional change in learning rate policy. ReLU layer was added after "conv2_1/linear" to be compatible with the current implementation of compression method. Hence, "conv2_1/linear" feature map includes signed integers in the original model and unsigned integers in the modified one. Note that batch normalization layers were observed to cause some instability to the training process. Accordingly, normalization and scaling parameters are fixed and merged into weights and biases of convolutional layers. The modified model was then retrained from the original one. FIG. 5 shows a table of MobileNetV2 ImageNet inference accuracy results. The columns correspond to the table in FIG. 4 for the most part. However, the types of models used under the heading "quantized, not converted to binary representation" are models including the signed integers described above (int9: 9-bit signed integer array, etc.).

The quantized models without ReLU after retraining experience −0.3%, −0.3%, and 0.3% top-1 accuracy drops for 9-bit, 7-bit, and 5-bit quantization, respectively, compared to fp32. Note that quantized MobileNetV2 is resilient to smaller bitwidths with only 0.6% degradation for the 5-bit model compared to the 9-bit model. On the other hand, the ReLU quantized model outperforms all other models in the table in terms of accuracy results.

Models represented in binary and using 1×1 convolution kernels experienced approximately the same scores as with conventional methods without binary representation. When 2×2 stride 2 convolution kernels were used, feature maps were compressed by another factor of 2 with around 4.5% accuracy degradation and 5% increase in weight size.

Although not included in the table, a comparison of results from when a 2×2 stride 2 convolution kernel was used and a 3×3 stride 2 convolution kernel was used showed that the former is superior in terms of both accuracy and data size.

Implementation Example 2

[Outline]

In this implementation example, a Pascal VOC dataset was used for object detection, and accuracies were evaluated. More specifically, 4,952 VOC2007 images and a training dataset of 16,551 VOC2007 and VOC2012 images were used. Moreover, an SSD (single shot detector) 512 model was used in execution of the method described in the above embodiment, and SqueezeNet pretrained on ImageNet was used for feature extraction instead of VGG-16. This reduces the number of parameters and overall inference time by a factor of 4 and 3, respectively.

The original VOC images are rescaled to 512×512 resolution. As with the implementation example with ImageNet, several models were generated for comparison: a floating-point model, quantized models, and compressed models. Quantization and compression were applied to the "fire2/squeeze" and "fire3/squeeze" layers which represent, if the fusion technique is applied, more than 80% of the total feature map memory due to their large spatial dimensions. Typically, spatial dimensions decrease quadratically because of max pooling layers compared to linear growth in the depth dimension. The compressed models are derived from the 8-bit quantized model, and both are retrained for 10,000 mini-batch-256 iterations using SGD solver with a step-policy learning rate starting from $1e^{-3}/10$ every 2,500 iterations.
[Results]

FIG. 6 shows a table of inference accuracy results according to this implementation example. From left to right, the columns indicate: model type; weight size; feature map, i.e., activation size; and mAP (mean average precision).

Among models that are quantized and not converted to binary representation (with retraining), compared to the floating-point model, the 8-bit quantized model decreases accuracy by 0.04%, while 6-bit, 4-bit, and 2-bit models decrease accuracy by approximately 0.5%, 2.2%, and 12.3%, respectively. Values inside parenthesis are reference values for models without retraining.

Among models using a 1×1 convolution kernel that include binary representation conversion, mAP for the 6-bit model is increased by approximately 0.5% and mAP for the 4-bit model is decreased by approximately 0.5%.

A model using a 2×2 convolution kernel with stride 2 performs better than a corresponding 3×3 convolution kernel while requiring less parameter and computations, exhibiting close to 1% higher mAP.

[Memory Usage]

FIG. 7 shows a table summarizing memory usage in the evaluated SSD models. Note that, here, only the largest feature maps that represent more than 80% of total activation memory are considered.

Assuming that the input frame is stored separately, the fusion technique allows for compression of feature maps by a factor of 19.

Fused and quantized 8-bit and 4-bit fixed-point models decrease the size of feature maps by a factor of 4 and 8, respectively.

When the method according to the embodiment described above that includes binary representation conversion (2×2 stride 2 kernel) is applied, this gains another factor of 2 compression compared to the 4-bit model described above with only 1.5% degradation in mAP.

In total, the memory usage required for this feature extractor is reduced by two orders of magnitude.

CONCLUSION

As described above, the DNN execution method according to this disclosure is performed by additionally including inference and learning over GF(2) in a conventional DNN method including fused layer computation and quantization. Such GF(2) binary representation allows for feature map compression in a higher-dimensional space using autoencoder inspired layers embedded into a DNN. These compression-decompression layers can be implemented using conventional convolution layers with bitwise operations. More precisely, the method according to the present disclosure trades cardinality of the finite field with the dimensionality of the vector space, which makes possible to learn features at the binary level. The compression method for inference according to the present disclosure can be adopted for GPUs, CPUs, or custom accelerators. Alternatively, existing binary neural networks can be extended to achieve higher accuracy for emerging applications such as object detection among others.

Other Embodiments

Hereinbefore, an execution method and a learning method for a DNN according to one or more aspects have been described based on an exemplary embodiment, but the present disclosure is not limited to this exemplary embodiment. As long as they do not depart from the essence of the present disclosure, various modifications to the exemplary embodiment conceived by those skilled in the art may be included as one of these aspects.

Figure 8:
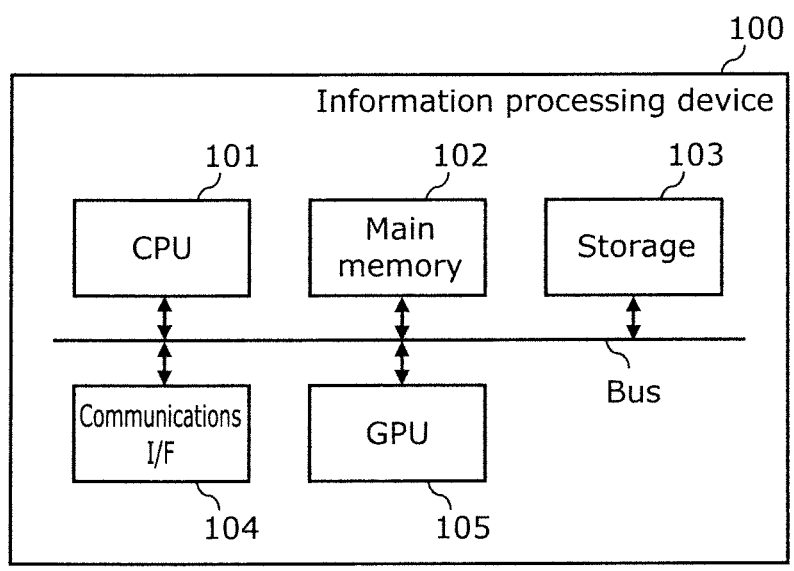
FIG. 8 is a block diagram illustrating a hardware configuration example of an information processing device that executes one of the above methods.

Moreover, although the exemplary embodiment in the present disclosure is described based on execution and learning methods for a DNN, the present disclosure can be implemented as execution and learning devices for a DNN including functional elements that execute the processes of each layer. Such devices are each implemented as one or more information processing devices each including, for example, a processor that executes the method and memory for storing the uncompressed feature maps. FIG. 8 is a block diagram illustrating a hardware configuration example of an information processing device according to this embodiment.

As illustrated in FIG. 8, information processing device 100 includes a CPU (central processing unit) 101, main memory 102, storage 103, a communications I/F (interface) 104, and a GPU (graphics processing unit) 105. These elements are connected via a bus, and are capable of sending and receiving data to and from one another.

CPU 101 is a processor that executes a control program stored in, for example, storage 103, and a program for, for example, implementing the DNN execution method described above.

Main memory 102 is a volatile storage area used by CPU 101 as a work area for executing the programs.

Storage 103 is a non-volatile storage area that stores, for example, the programs.

Communications I/F 104 is a communications interface that communicates with external devices via a communications network (not shown in the drawings). For example, when the DNN execution device is implemented as a plurality of information processing devices 100, the sending and receiving of data between information processing devices 100 is performed by communications I/F 104 via the communications network. Communications I/F 104 is, for example, a wired LAN interface. Note that the communications I/F 104 may be a wireless LAN interface. Moreover, the communications I/F 104 is not limited to a LAN interface; communications I/F 104 may be any sort of communications interface that is capable of communicatively connecting to a communications network.

GPU 105 is, for example, a processor that executes a program for implementing the DNN learning method described above.

The present disclosure can also be implemented as a program for causing an information processing device including a processor and memory to execute the DNN execution or learning method according to the embodiment, and as a non-transitory recording medium having such a program recorded thereon.

INDUSTRIAL APPLICABILITY

The present disclosure is applicable in computer vision applications such as image classification and object detection.

The invention claimed is:

1. An execution method for a deep neural network, the execution method comprising:

obtaining, during deep neural network inference, a binary intermediate feature map in binary representation by converting, using a first transformation module, a floating-point or fixed-point value of an intermediate feature map into a binary vector having a number of elements equal to a number of bits used to represent the floating-point or fixed-point value;

generating a compressed feature map by compressing the binary intermediate feature map using a nonlinear dimensionality reduction layer;

storing the compressed feature map into memory;
reconstructing the binary intermediate feature map by decompressing the compressed feature map read from the memory using a reconstruction layer corresponding to the nonlinear dimensionality reduction layer; and
converting the reconstructed binary intermediate feature map into an intermediate feature map having a floating-point or fixed-point value using a second transformation module.

2. The execution method according to claim 1, wherein the nonlinear dimensionality reduction layer is a single projection convolved layer or a sequence of projection convolved layers, and
the reconstruction layer is a single reconstruction convolved layer or a sequence of reconstruction convolved layers.

3. A backpropagation-based learning method for the deep neural network executed using the execution method according to claim 1, the learning method comprising:
applying an analytical derivative of the first transformation module and the second transformation module to a gradient for a next layer among layers included in the deep neural network to generate a gradient for a previous layer among the layers included in the deep neural network;
updating a weight and a bias based on the gradient generated for the previous layer; and
initializing a weight for the nonlinear dimensionality reduction layer and a weight for the reconstruction layer, based on an identity mapping function.

4. A non-transitory computer-readable recording medium for use in a computer, the recoding medium having a computer program recorded thereon for causing the computer to execute the learning method according to claim 3.

5. A learning device for a deep neural network, the learning device comprising:
a processor that executes backpropagation-based learning by the deep neural network executed using the execution method according to claim 1, wherein the processor:
applies an analytical derivative of the first transformation module and the second transformation module to a gradient for a next layer among layers included in the deep neural network to generate a gradient for a previous layer among the layers included in the deep neural network;
updates a weight and a bias based on the gradient generated for the previous layer; and
initializes a weight for the nonlinear dimensionality reduction layer and a weight for the reconstruction layer, based on an identity mapping function.

6. A non-transitory computer-readable recording medium for use in a computer, the recoding medium having a computer program recorded thereon for causing the computer to execute the execution method according to claim 1.

7. An execution device for a deep neural network, the execution device comprising:
a processor that executes deep neural network inference, wherein the processor:
obtains a binary intermediate feature map in binary representation by converting, using a first transformation module, a floating-point or fixed-point value of an intermediate feature map into a binary vector having a number of elements equal to a number of bits used to represent the floating-point or fixed-point value;
generates a compressed feature map by compressing the binary intermediate feature map using a nonlinear dimensionality reduction layer;
stores the compressed feature map into memory;
reconstructs the binary intermediate feature map by decompressing the compressed feature map read from the memory using a reconstruction layer corresponding to the nonlinear dimensionality reduction layer; and
converts the reconstructed binary intermediate feature map into an intermediate feature map having a floating-point or fixed-point value using a second transformation module.

* * * * *